US008242632B2

(12) United States Patent
Evertz

(10) Patent No.: US 8,242,632 B2
(45) Date of Patent: Aug. 14, 2012

(54) LIFTING MAGNET AND METHOD FOR EMERGENCY POWER SUPPLY

(76) Inventor: Egon Evertz, Solingen (DE)

( * ) Notice: Subject to any disclaimer, the term of this patent is extended or adjusted under 35 U.S.C. 154(b) by 180 days.

(21) Appl. No.: 12/676,171

(22) PCT Filed: Aug. 20, 2008

(86) PCT No.: PCT/DE2008/001382

§ 371 (c)(1),
(2), (4) Date: Mar. 3, 2010

(87) PCT Pub. No.: WO2009/056084

PCT Pub. Date: May 7, 2009

(65) Prior Publication Data

US 2010/0219689 A1 Sep. 2, 2010

(30) Foreign Application Priority Data

Oct. 29, 2007 (DE) ........................ 10 2007 051 944

(51) Int. Cl.
*H02J 9/00* (2006.01)

(52) U.S. Cl. ........................................... 307/66; 307/64

(58) Field of Classification Search .................... 307/64, 307/66

See application file for complete search history.

(56) References Cited

U.S. PATENT DOCUMENTS

| | | | | |
|---|---|---|---|---|
| 3,454,781 | A | 7/1969 | Scholler | 307/66 |
| 4,032,828 | A * | 6/1977 | Strobl et al. | 320/123 |
| 4,387,305 | A * | 6/1983 | DeViney et al. | 307/66 |
| 4,468,571 | A * | 8/1984 | Heavey et al. | 307/66 |
| 5,111,058 | A * | 5/1992 | Martin | 307/66 |
| 5,912,514 | A * | 6/1999 | Stendardo et al. | 307/64 |
| 6,163,088 | A * | 12/2000 | Codina et al. | 307/64 |
| 6,462,507 | B2 * | 10/2002 | Fisher, Jr. | 320/101 |
| 7,033,406 | B2 | 4/2006 | Weir et al. | 29/623.5 |
| 7,453,169 | B2 * | 11/2008 | Grundmann et al. | 307/64 |
| 7,752,145 | B2 * | 7/2010 | Kelty | 700/295 |
| 7,786,620 | B2 * | 8/2010 | Vuk et al. | 307/66 |
| 7,802,121 | B1 * | 9/2010 | Zansky et al. | 713/340 |
| 2005/0280312 | A1 * | 12/2005 | Litovsky et al. | 307/64 |
| 2006/0108875 | A1 * | 5/2006 | Grundmann et al. | 307/70 |
| 2006/0192433 | A1 | 8/2006 | Fuglevand et al. | 307/64 |
| 2010/0007301 | A1 * | 1/2010 | Ochsenbein et al. | 318/563 |

FOREIGN PATENT DOCUMENTS

| | | | |
|---|---|---|---|
| DE | 690349 | B | 4/1940 |
| GB | 191030075 | B | 0/1910 |

* cited by examiner

*Primary Examiner* — Adi Amrany
(74) *Attorney, Agent, or Firm* — Andrew Wilford

(57) ABSTRACT

The invention relates to a lifting magnet (11), comprising an emergency power source (121) effective during a mains power failure, said emergency power source having a plurality of high-performance capacitors (12), preferably double-layer capacitors, and to a method for the emergency power supply of a lifting magnet comprising a mains voltage (10), a transmitter (32), a receiver (33) with a relay (311) and an emergency power source (121). According to the invention, the transmitter modulates a (high) frequency test signal (34) on the mains voltage, said test signal being received and evaluated by a receiver connected to the mains voltage, wherein the receiver has a relay, by means of which the emergency power source is connected to the mains voltage when the receiver does not receive the received test signal.

12 Claims, 2 Drawing Sheets

LIFTING MAGNET AND METHOD FOR EMERGENCY POWER SUPPLY

CROSS REFERENCE TO RELATED APPLICATIONS

This application is the US-national stage of PCT application PCT/DE2008/001382, filed 20 Aug. 2008, published 7 May 2009 as WO2009/056084, and claiming the priority of German patent application 102007051944.5 itself filed 29 Oct. 2007, whose entire disclosures are herewith incorporated by reference.

FIELD OF THE INVENTION

The invention relates to a magnetic grab comprising an emergency power supply that becomes operative during a line-power failure.

In addition, the invention relates to a method of supplying emergency power for a magnetic grab comprising a supply of line voltage, a transmitter, a receiver including a relay and an emergency power supply.

BACKGROUND OF THE INVENTION

Magnetic grabs for lifting, turning, and transporting heavy bodies composed of magnetically attractable material, in particular, slabs, coils, or other magnetically attractable heavy loads, are known from the prior art. Some of these magnets can lift loads of up to 80 tons.

Electromagnets are frequently attached to trolleys, cranes, or similar hoisting mechanisms that then must exert a maximum lifting force composed of the weight of the electromagnets used and the weight to be lifted or load to be transported. For this reason, there has always been an effort to keep the weight of the electromagnets as low as possible, which can be done by selecting the appropriate material, for example aluminum instead of copper.

The problem that, however, remains unsolved is how an emergency power supply can be provided that becomes operative fast enough to prevent the suspended load from dropping in the event of a failure in the line-voltage power system. In terms of the electromagnets considered here that operate on DC power, the first possible solution is a battery that is connected in parallel with the line-voltage power source and is switched on by a switching device when the line voltage drops. Since what must be supplied is relatively high electrical currents over a certain period of time, the resulting battery capacity is high and can only be implemented using a battery of corresponding weight. This weight appears as an additional load which accordingly minimizes the total capacity of the trolley or crane employed.

OBJECT OF THE INVENTION

With the intended goal of preventing the risk of accident for persons moving around near electromagnets in a work bay, the problem to be solved by the invention is to provide an emergency power supply and a method of providing the emergency power supply that effectively bridge the short-term supply voltage failures or voltage drops, and that supply the electrical power required to hold the load for a period of 5 seconds, preferably 10 seconds or more, in the event of a total power failure. The emergency power supply system should be of the lowest possible weight.

SUMMARY OF THE INVENTION

In order to attain this object, the invention proposes a plurality of high-performance capacitors as the emergency power supply, preferably, double-layer capacitors. High-performance capacitors are understood to mean those capacitors that are called supercapacitors or ultracapacitors in the literature. A high-performance capacitor of this type is described, for example, in U.S. Pat. No. 7,033,406, although in regard to another application. The high capacitance of double-layer capacitors is based on a dissociation of ions in a liquid electrolyte and a large electrode surface. The capacitors are composed of two electrodes that are wetted with an electrolyte. When the applied voltage is lower than the decomposition voltage, ions of different polarity collect at both electrodes, thereby forming a zone of immobile charge carriers with a layer thickness of a few molecule layers. By using materials of large surface area, such as for example activated carbon, it is possible to achieve capacitances that measure up to 5,000 farads (F). Given maximum voltages of up to 2.5 V, it is possible to achieve electrical currents of up to 500 A on these high-performance capacitors, which currents in electrical magnetic grabs are sufficient over a short period to hold the load for a number of seconds that are then sufficient to allow the operating personnel located underneath the suspended load to move to a safe location.

Preferably, a voltage sensor connected to a control circuit is provided that switches from connection to line voltage to connection to the high-performance capacitors in the event the line voltage drops below a specified value. Whenever this involves only a transient voltage drop, the voltage sensor ensures that the arrangement once again switches back to line voltage when the minimum voltage for the line-voltage power source is exceeded. In this case, the high-performance capacitors—of which, for example, 88 high-performance capacitors are connected in parallel to achieve a line voltage of 220 V-function to supply the operating voltage.

In another embodiment of the invention, provision is made whereby the drop in the line voltage below a specified level triggers an acoustic and/or visual warning signal. This warning signal clearly warns persons located within the effective range of operation of the electromagnet that the load is about to drop. In the event this involves only a transient voltage drop that can be bridged by the high-performance capacitors, the warning signals are turned off as soon as the arrangement switches back to operation with the line voltage. The power supply required for the warning signals can initially be provided by the line-voltage power source, then after switchover by the high-performance capacitors.

In another embodiment of the invention, the high-performance capacitors are charged when the electromagnet is switched on, then periodically recharged during continuous line-voltage operation so as to counteract an unavoidable loss of charge in the capacitors.

The basic idea of the present invention consists in providing a timely warning to persons located in the operational area of the magnetic grab, in particular, below a suspended load, in order to allow them to move to a safe place before the impending dropping of the load. The type of warning signal to accomplish this is of secondary importance as long as the warning signal can be clearly perceived. Also of secondary importance are the circuits used in each case that ensure that the emergency power supply and the warning signal are not activated in response to an intentional shutdown of the electromagnet (for example after depositing the load). In the simplest case, a circuit arrangement can be selected comprising two switches that are actuated simultaneously when the magnetic grab is switched off intentionally, one of the switches cutting the connection to the emergency power supply. Alternatively, however, other control devices can also be provided that detect an impending voltage drop or total power failure, and activate the emergency power supply so as to continue to hold the load on the magnetic grab for a certain period, depending on the capacitance of the capacitors.

Provision is advantageously made whereby a power-supply cable is connected to a transmitter and a receiver, the receiver having a relay that can connect the emergency power supply to the supply cable, the emergency power supply preferably being directly on the electromagnet. Provision is made whereby the transmitter outputs a signal at a frequency of between 50 and 150 kHz, preferably, 100 kHz, that is received by the receiver.

This advantageous embodiment is provided to respond to a power failure or power-cable rupture, since this way the receiver does not receive the test signal outputted by the transmitter, thereby enabling the emergency power supply to be quickly connected to the system. In order to ensure that the emergency power supply functions if there is any break in the cable, the cable between the emergency power supply unit and the magnetic grab must not remain intact. The emergency power supply is provided directly or indirectly on the magnetic grab so as to be as close as possible in order to minimize the likelihood of this occurring. A test signal frequency between 50 kHz and 150 kHz, in particular 100 kHz, has been found to be especially advantageous for this type of "cable-break testing." Higher and lower frequencies are in principle also suitable.

Magnetic grabs of the category claimed are generally used in large work bays where, due to the large variety of equipment, a plurality of warning devices are found. Experience has shown that the warning effect of a siren or lamp is more effective if it is generated directly at the source of the hazard, since then the persons to be warned are able to detect the source of the danger. For this reason, the siren and/or the warning lamp are mounted directly on the electromagnet, or at least as close to it as possible.

The following table illustrates the technical data for the claimed device.

| | |
|---|---|
| Input voltage: | ±110 VDC/±220 VDC |
| Modulation frequency: | 100 kHz |
| Potential-free contact: | 250 VAC/6 A |
| Duration of alarm sound: | >10 s |
| Loudness level: | >65 dB(A) |
| Operation time after disconnection: | >20 s |
| Retention of load after fault: | >5 s |
| Reaction time after signal dropout: | <50 ms |

In order to solve the basic problem of the invention, a method is furthermore proposed for supplying emergency power to a magnetic grab comprising a line-voltage power source, a transmitter, a receiver including a relay, and an emergency power supply. According to the invention, the transmitter outputs a (high)-frequency test signal that is received and evaluated by a receiver connected to the line-voltage supply cable, the receiver having a relay by which the emergency power supply is connected to line voltage whenever the receiver is not receiving the received test signal.

In particular, the method according to the invention ensures that the emergency power supply is quickly and reliably connected to the system in the event of cable breaks.

A current sensor is preferably disposed in the line-voltage supply cable to monitor the amperage therein during operation. Whenever values drop below a selectable threshold, the emergency power supply is connected to the system through a relay. This specific measure enables both a cable break and also a slow or steady decrease in the supply current to be detected.

In order to ensure to that the warning lamp and/or warning siren, as well as the emergency power supply, are not activated in response to an intentional shutdown of the magnetic grab, provision is made in a preferred embodiment of the invention whereby the transmitter and receiver are only active when the magnet is turned on and up to approximately 20 seconds after the magnet is turned off. To this end, transmitter and receiver have capacitors that supply the requisite electrical power. Care must be taken to ensure the capacitor of the receiver is discharged before the capacitor of the transmitter. The capacitor of the receiver could have a lower capacitance, or the receiver has a greater current consumption than the transmitter.

BRIEF DESCRIPTION OF THE DRAWING

Additional details are found in the drawings. Therein.

DETAILED DESCRIPTION

Figure 1:
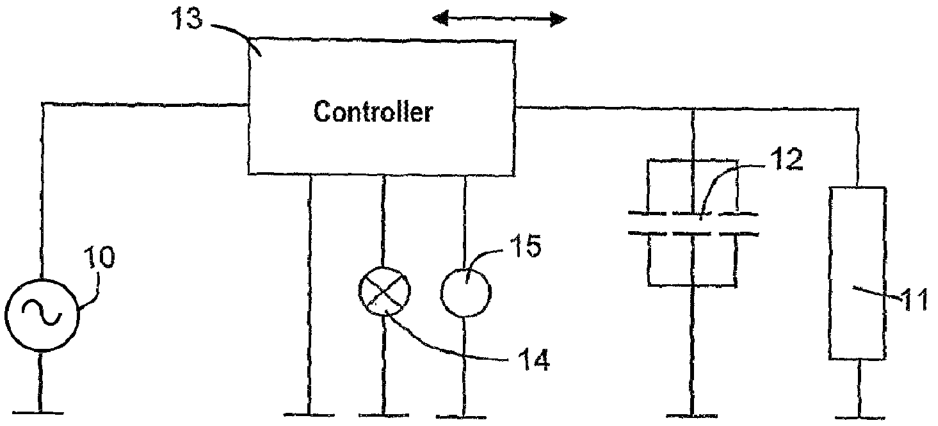
FIG. 1 is a schematic diagram illustrating the circuit of the magnetic grab according to the invention.

FIG. 1 shows a line-voltage source 10 that during normal operation supplies electric current to the electromagnet 11 (here shown as a resistor). In addition, multiple series-connected high-performance capacitors 12 are connected parallel to the line-voltage source 10 that are charged when the electromagnet is energized and are activated by being switched in by a control circuit 13. As soon as the voltage from the line-voltage source 10 falls below a specified value determined by the point below which the required carrying force can no longer be applied, the high-performance capacitors are discharged and, depending on the capacitance available and current requirement of the electromagnet, supply the power required to hold the load for a number of seconds. When the system switches over to high-performance capacitors 12, an acoustic siren 14 and warning lamp 15 are activated that indicate that the load may soon drop.

Figure 2:
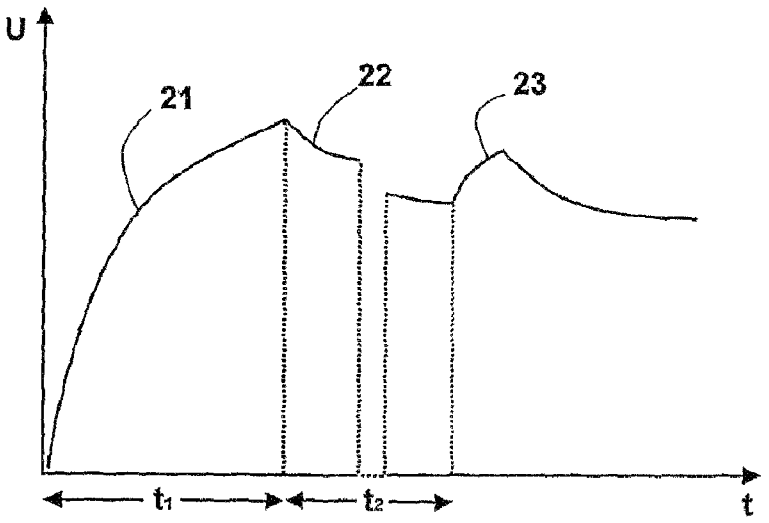
FIG. 2 is a voltage-time diagram of a high-performance capacitor that is recharged at periodic intervals.

FIG. 2 illustrates a voltage time curve for a high-performance capacitor. During a time period $t_1$, the voltage rises along curve segment 21 up to a maximum value, for example, 2.5 V. During a time $t_2$, this voltage can drop (curve 22). Once a minimum value is reached, the high-performance capacitor is recharged by the control circuit 13 (see curve 23). This process can be repeated periodically, as required, as often as needed while the electromagnet is being supplied with line voltage.

Figure 3:
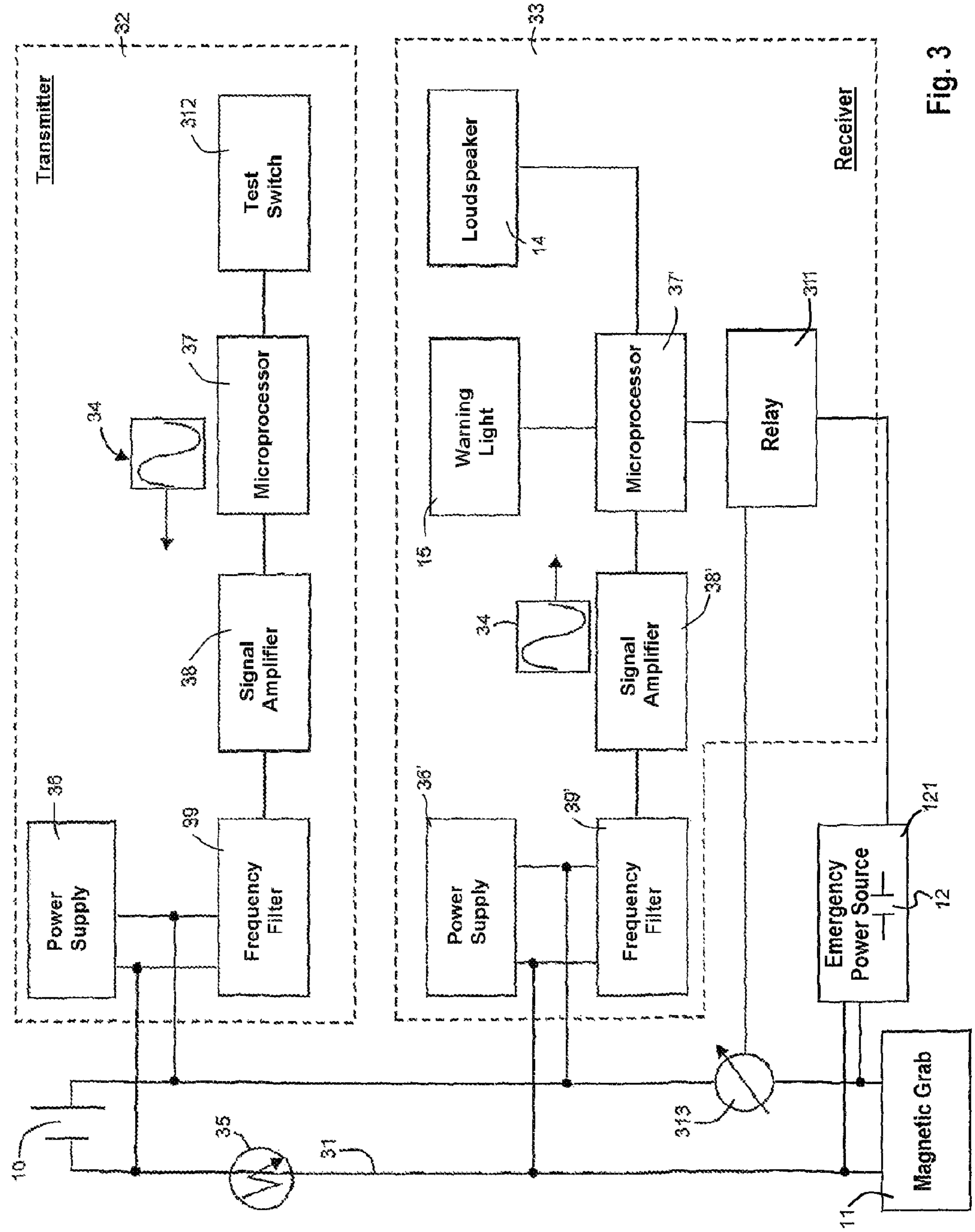
FIG. 3 is a schematic diagram illustrating a magnetic grab with an emergency power supply and warning lamps.

FIG. 3 is a schematic diagram illustrating a magnetic grab 11 that is connected to a line-voltage source 10. A high-frequency transmitter 32 and a high-frequency receiver 33 are connected in parallel to an electric power-supply cable 31. The transmitter 32 outputs a high-frequency signal (test signal 34) at approximately 100 kHz onto the circuit, which signal is received by the receiver 33. As long as the receiver 33 receives the test signal 34, the cable is intact with the result that the emergency power supply 12 is isolated from the power-supply cable 31. In the event of a cable break (for example, at point 35), the signal 34 is no longer outputted onto the circuit and the receiver no longer receives it. As soon as the receiver within a time span of approximately 20 ms is no longer registering a test signal, the emergency power supply 12 is connected by the control circuit 13 to the line-voltage supply cable 31 and the magnetic grab 11 is supplied with current for a given amount of time. At the same time, the siren 14 and the warning lamp 15 are activated and signal that the load will soon drop. To ensure that the transmitter 32 and receiver 33 continue to function even during a loss of power, both have internal power supplies (not shown) that preferably are capacitors integrated into respective power supplies 36, 36'.

When the magnetic grab is turned on, the power supplies 36, 36' are activated and supply power to the transmitter 32 and receiver 33. At the same time, the emergency power supply 12 (preferably, one or more capacitors) is charged such that, when the supply voltage fails, power is supplied to the magnetic grab for more than 5 s, preferably 20 s. At the same time, the microprocessor 37 generates a 100 KHz test signal 34 of approximately 100 kHz that is boosted in a signal amplifier 38. The signal passes through a frequency filter 39 to the line-voltage supply cable 31 of the magnetic grab 11. The signal is filtered by the frequency filter 39 of the receiver 33, and adapted in the signal amplifier 38 to the level of the microprocessor 37.

When no test signal 34 is received within a time interval of approximately 20 ms, this is interpreted as a cable break, with the result that the microprocessor 37 activates the warning lamp 14 and siren 15. In addition, the emergency power supply 12 is connected through relay 311 to the cable 31.

In order to ensure no false alarm is triggered when the device is turned on, the receiver 33 is activated relative to the transmitter only after a delay of several milliseconds. A false alarm must also be prevented in response to the system's being turned off intentionally, and to this end provision is made whereby the supplies 36, 36' have internal capacitors (not shown) that continue to supply power for a given time to the transmitter 32 and receiver 33. Care must be taken here that the power supply of the receiver stops operating before the power supply of the transmitter.

The transmitter 32 has a test switch 312 to test the circuit, during which test the generation of test signals 34 by the microprocessor 37 can be interrupted such that the receiver activates the warning function and the emergency power supply.

The transmitter 32 and receiver 33 can in principle be of the same design since essential components are identical, with the result that the two are differentiated only by the software in their microprocessors 37, 37'.

In order to ensure that the emergency power supply is connected to the system when the voltage drops below a specified threshold value, a current sensor 313 is integrated into the cable 31 to monitors the power supply to the magnetic grab 11. The current sensor 313 is also connected to the relay 311 such that the emergency power supply is also actuated when the power supply is deficient.

The advantages of the embodiment according to the invention consist particularly in the fact that a high load capacity and efficiency can be provided using a series of high-performance capacitors. High-performance capacitors have a high cycle stability and high output (even at low temperatures). As compared with batteries, high-performance capacitors are of extremely low weight, are of small overall size, and have a high reliability that enables a total output to be provided that is higher than for batteries. Furthermore, the service life of high-performance capacitors, which can undergo up to 1 million charge cycles without any loss of performance, is longer than that of batteries.

In addition, high-performance capacitors are robust, a feature that is also advantageous during the rough operation of an electromagnet, as is the fact that the capacitors are practically maintenance-free. The high-performance capacitors enable a high current level to be provided quickly in DC operation, with the result that a practically uninterrupted power supply is ensured over a certain time period after a line-power failure, this time period being a function of the total capacitance of the high-performance capacitors employed.

The invention claimed is:

1. In combination with an electromagnetic grab normally powered from a line-voltage source having a cable with an outer end connected to the grab:

a plurality of high-performance capacitors on the grab, connected in parallel, and forming an emergency power supply;

a relay at the outer end of the cable on the grab, operatively connected to the line-voltage source and to the grab, and switchable between a normal position powering the grab from the line-voltage source and not from the emergency power supply and an emergency position powering the grab from the emergency power supply and not from the line voltage source;

alarm means activatable for generating an alarm signal;

control means connected to the relay and to the alarm means for, on detection of a current or voltage parameter of the line voltage being below a predetermined respective threshold, switching the relay into the emergency position and activating the alarm means;

a transmitter connected to an inner end of the cable for continuously outputting into the cable a high-frequency signal; and a receiver on the grab at the outer end of the cable connected to the relay for operating the relay when the receiver no longer receives the signal.

2. The combination defined in claim 1 wherein both the transmitter and receiver are normally powered from the line-voltage source but have separate respective power supplies capable of powering the transmitter and receiver for respective predetermined limited time periods.

3. The combination defined in claim 2 wherein the limited time period of the receiver is shorter than that of the transmitter.

4. The combination defined in claim 1, further comprising:

means on the grab for charging the emergency power supply when the relay is in the normal position.

5. The combination according to claim 1, wherein the relay switches the grab from connection to the line-voltage source over to connection with the high-performance capacitors in response to a drop in the line voltage below a specified value.

6. The combination according to claim 5 wherein the alarm means generates an acoustic or visual alarm signal in response to the drop in the line voltage.

7. The combination according to claim 1, further comprising:

a transmitter connected to a line-voltage supply cable, and a receiver connected to the line-voltage supply cable and to the relay.

8. The combination according to claim 7 wherein the transmitter and receiver transmit and receive frequencies that range between 50 and 150 kHz.

9. The combination according to claim 7 wherein the transmitter and the receiver have respective internal emergency power supplies.

10. A method of operating an electromagnetic grab, the method comprising the steps of:

normally powering the grab from a line-voltage power-supply cable;

connecting a transmitter and a receiver having a relay to the cable;

outputting from the transmitter into the line-voltage supply cable a high-frequency test signal; and receiving and evaluating the signal with a receiver connected to the cable and operating the relay to connect an emergency power supply to the cable whenever the receiver is not receiving the test signal.

11. The method according to claim 10, further comprising the steps of:

measuring line voltage continuously by a current sensor, and connecting the emergency power supply by the relay to the grab when the measured current falls below a threshold value.

12. The method according to claim 11, further comprising the step of:

generating an acoustic or visual signal whenever the receiver is not receiving the test signal to be received or whenever the current sensor detects that the amperage has fallen below the defined threshold value.

* * * * *